(12) United States Patent
Jung

(10) Patent No.: US 9,678,630 B2
(45) Date of Patent: Jun. 13, 2017

(54) METHOD AND APPARATUS FOR MANAGING ELECTRONIC BOOKS

(71) Applicant: Samsung Electronics Co. Ltd., Suwon-si, Gyeonggi-do (KR)

(72) Inventor: Suk-In Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 13/912,785

(22) Filed: Jun. 7, 2013

(65) Prior Publication Data

US 2014/0019898 A1 Jan. 16, 2014

(30) Foreign Application Priority Data

Jul. 16, 2012 (KR) ........................ 10-2012-0077264

(51) Int. Cl.
*G06F 3/0486* (2013.01)
*G06F 3/0483* (2013.01)
*G06F 3/0481* (2013.01)
*G09B 5/06* (2006.01)

(52) U.S. Cl.
CPC .......... *G06F 3/0483* (2013.01); *G06F 3/0486* (2013.01); *G06F 3/04817* (2013.01); *G09B 5/062* (2013.01)

(58) Field of Classification Search
CPC .. G06F 3/0483; G06F 3/0486; G06F 3/04817; G09B 5/062
USPC .................................................. 715/769, 776
See application file for complete search history.

(56) References Cited

U.S. PATENT DOCUMENTS

| | | | | |
|---|---|---|---|---|
| 5,002,491 A | * | 3/1991 | Abrahamson | G09B 7/04 434/322 |
| 6,674,992 B2 | * | 1/2004 | Helmick | G09B 5/00 434/350 |
| 2005/0086296 A1 | * | 4/2005 | Chi | G06Q 10/10 709/203 |
| 2008/0243788 A1 | * | 10/2008 | Reztlaff | G06F 17/30657 |
| 2012/0102395 A1 | * | 4/2012 | Cho | G06F 15/0291 715/253 |
| 2012/0105460 A1 | | 5/2012 | Kim | |
| 2012/0221938 A1 | * | 8/2012 | Patterson | G06F 17/2235 715/232 |
| 2013/0212485 A1 | * | 8/2013 | Yankovich | G06F 9/4451 715/741 |
| 2013/0227682 A1 | * | 8/2013 | Tse | G06F 17/30873 726/22 |

FOREIGN PATENT DOCUMENTS

| | | |
|---|---|---|
| KR | 10-2012-0011215 A | 2/2012 |
| KR | 10-2012-0017390 A | 2/2012 |

* cited by examiner

*Primary Examiner* — Kevin L Young
*Assistant Examiner* — Seth A Silverman
(74) *Attorney, Agent, or Firm* — Jefferson IP Law, LLP

(57) ABSTRACT

A method for managing an electronic book (e-book) is provided. The method includes mapping e-books corresponding to class textbooks by time zone based on a timetable, displaying the timetable comprising objects corresponding to the e-books mapped by time zone and class related information, and, if any one of the objects corresponding to the e-books is touched, opening and displaying a page of an e-book corresponding to the touched object.

26 Claims, 12 Drawing Sheets

FIG. 3

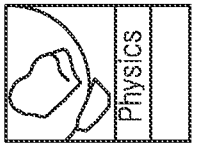
FIG. 4A
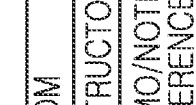
FIG. 4B

DAY OF THE WEEK

| TIME \ DAY OF THE WEEK | FRI | |
|---|---|---|
| CLASS 1.<br>( 09:00–09:50 ) | Psychology<br>[Biology] | ROOM : 56012<br>INSTRUCTOR : JMES<br>✎(10) \| today's homework is white |
| CLASS 2.<br>( 10:00–10:50 ) | Science<br>[Science] | ROOM : 30122<br>INSTRUCTOR : Martin<br>✎(10) \| This sentence is too hard...<br>◆(02) \| refercne.gul |
| CLASS 3.<br>( 11:00–11:50 ) | History<br>[History] | ROOM : 30433<br>INSTRUCTOR : Richard<br>✎(10) \| This sentence is too hard...<br>☐(03) \| 2012.02.25 read p123 |
| CLASS 4.<br>( 12:00–12:50 ) | History<br>[History] | ROOM : 30433<br>INSTRUCTOR : Richard<br>☐(03) \| 2012.02.25 read p123 |

FIG.5

SUBJECT

| SUBJECT | |
|---|---|
| Algebra<br/>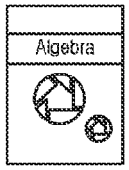 | ROOM : 65123<br/>INSTRUCTOR : Jackins<br/>(10) \| today's homework is white<br/>(02) \| refercne.gul |
| Biology<br/> | ROOM : 12123<br/>INSTRUCTOR : Tommy<br/>(10) \| This sentence is too hard... |
| History<br/> | ROOM : 30433<br/>INSTRUCTOR : Rjchard<br/>(03) \| 2012.02.25 read p123 |
| Logic<br/>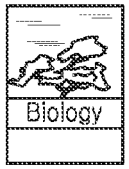 | ROOM : 30123<br/>INSTRUCTOR : Andrey<br/>(03) \| 2012.02.25 read p123<br/>(10) \| This sentence is too hard...<br/>(02) \| refercne.gul |
| Math<br/> | ROOM : 43122<br/>INSTRUCTOR : Ann<br/>(10) \| This sentence is too hard... |
| Physics<br/>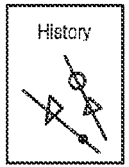 | ROOM : 30123<br/>INSTRUCTOR : Andrey<br/>(03) \| 2012.02.25 read p123<br/>(10) \| This sentence is too hard...<br/>(02) \| refercne.gul |

FIG.6

METHOD AND APPARATUS FOR MANAGING ELECTRONIC BOOKS

PRIORITY

This application claims the benefit under 35 U.S.C. §119(a) of a Korean patent application filed on Jul. 16, 2012 in the Korean Intellectual Property Office and assigned Serial No. 10-2012-0077264, the entire disclosure of which is hereby incorporated by reference.

BACKGROUND OF THE INVENTION

1. Field of the Invention

The present invention relates to an electronic book (c gook) (e-book). More particularly, the present invention relates to a user interface for managing e-books in an electronic device.

2. Description of the Related Art

With the growth of Internet and digital technology, books are now produced in a digital form. Such books are designated as e-books. It is expected that e-books are widely used in the digital age due to their low prices since e-books do not incur a publishing cost, do not consume materials such as paper and ink, do not cause anxiety about sufficient supply, and do not incur a distribution cost. At present, e-books occupy a very small portion in the book market, but it is expected that they will occupy a considerable portion in the future since the number of e-books published is gradually increasing and even the e-book market scale is increasing day by day.

With the increased use of smart phones, it seems apparent that the smart phones would be more preferred as e-book terminals. If the smart phones are utilized as the e-book terminals, it will be possible to develop contents not only supporting various multimedia functions of e-books possessed by dedicated terminals but also supporting interaction using the various devices and sensors of the smart phones. In recent years, as the number and sophistication of functions of the smart phone has increased and improved, an attempt is being made to provide various educational services. For example, various sensors and devices are being used for correction of a user's pronunciation, for writing exercises using a touch sensor, and even for homework submission through the Internet.

To use the e-book, a user installs an e-book program or application in the smart phone and receives access to the e-book through the Internet or through an external port (e.g., a Universal Serial Bus (USB) port, etc.) of the smart phone and then, whenever the user wants something to read the e-book, executes the e-book program and selects the e-book for display.

The e-book application of the related art provides a user interface displaying e-books stored in a smart phone's memory in a bookshelf form or displaying the stored e-books in a list form.

FIGS. 1A and 1B illustrate examples of displaying e-books in a smart phone according to the related art.

FIG. 1A illustrates an example of displaying e-books in a bookshelf form, and FIG. 1B illustrates an example of displaying the e-books in a list form.

E-book applications are mostly provided in a list form or a thumbnail image (i.e., an image containing outer cover information) form. By sorting e-books by reception date, author, or title when a user views the e-book application in the list form, the e-book application provides a display that is convenient to the user. However, this construction is a common display scheme for general users.

Recently, the increased use of smart phones has resulted in an increased interest in e-books. More specifically, there is a growing interest for educational e-books and educational applications (hereinafter, referred to as "applications"), such as a general book, a textbook, an exercise book, and the like. The educational applications of concern are mostly for textbooks and textbook related contents, and their targets are students who attend classes (or lectures). However, there is not currently a user friendly interface for viewing e-books.

Accordingly, students and other users who make use of books or textbooks or participants who listen to lectures require a user interface for viewing e-books.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide a user interface for electronic book (e-book) management of a timetable form for students who attend classes or participants who listen to lectures.

Another aspect of the present invention is to provide a method and apparatus for, at a class time or a lecture time, automatically opening an e-book managed in a timetable form or notifying a user of the opening or non-opening of the e-book.

A further aspect of the present invention is to provide a method and apparatus for, by providing a user interface for allowing a homework or memo function and reference documents for each class time or lecture time to interwork with a corresponding e-book, integrally managing contents necessary for a class-oriented school life.

The above aspects are achieved by providing a method and apparatus for managing an e-book.

In accordance with an aspect of the present invention, a method for managing an e-book in an electronic device is provided. The method includes mapping e-books corresponding to class textbooks by time zone, based on a timetable, displaying the timetable comprising objects corresponding to the e-books mapped by time zone and class related information, and, if any one of the objects corresponding to the e-books is touched, opening and displaying a page of an e-book corresponding to the touched object.

In accordance with an aspect of the present invention, an electronic device is provided. The electronic device includes a memory for storing data and instructions, one or more processors for executing computer programs, and one or more modules stored in the memory and configured to be executed by the one or more processors. The one or more modules map e-books corresponding to class textbooks by time zone, based on a timetable, display the timetable comprising objects corresponding to the e-books mapped by time zone and class related information, and, if any one of the objects corresponding to the e-books is touched, open and display a page of an e-book corresponding to the touched object.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description when taken in conjunction with the accompanying drawings, in which:

FIG. 3 illustrates a user interface for e-book management of a timetable form according to an exemplary embodiment of the present invention;

FIGS. 4A and 4B illustrate examples of a screen display per time zone according to a bookcase display mode according to an exemplary embodiment of the present invention;

FIG. 5 illustrates a day of the week view according to an exemplary embodiment of the present invention;

FIG. 6 illustrates a subject view according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described below, exemplary embodiments of the present invention include a method and apparatus for managing electronic books (e-books). More particularly, exemplary embodiments of the present invention relate to an electronic device in which it is possible to select a specific object by a screen touch or a mouse and which makes it possible for a user to input a text. An exemplary function of the present invention includes a communication function. Also, exemplary embodiments of the present invention include a user interface for allowing a specific target (i.e., student) to conveniently view an e-book in the electronic device meeting this condition.

In the following description, the electronic device can be a portable electronic device, or can be a device such as a portable terminal, a mobile phone, a mobile pad, a media player, a tablet computer, a handheld computer, or a Personal Digital Assistant (PDA). Also, the electronic device may be any portable electronic device including a device having a combination of two or more functions among these devices.

Figures 1A, 1B:
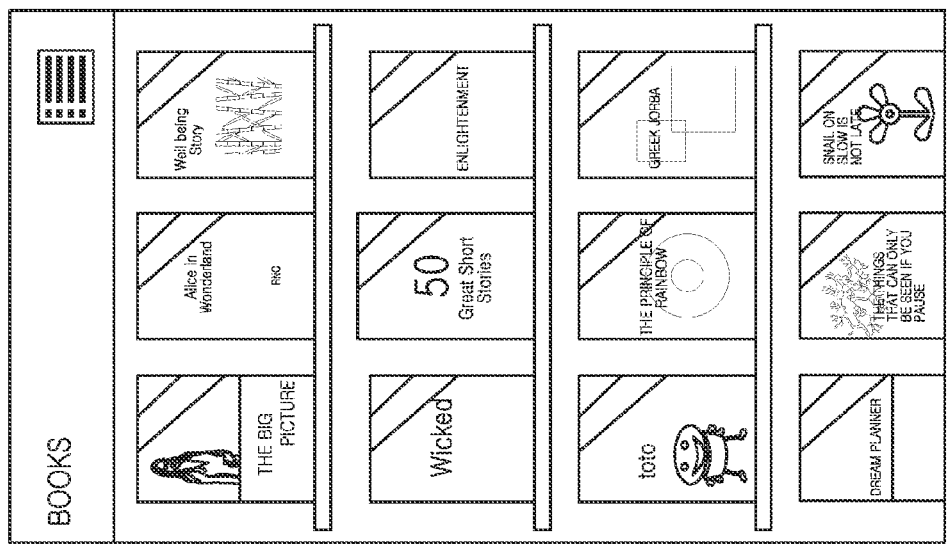
FIGS. 1A and 1B illustrate examples of displaying electronic books (e-books) in a smart phone according to the related art.
Figure 2:
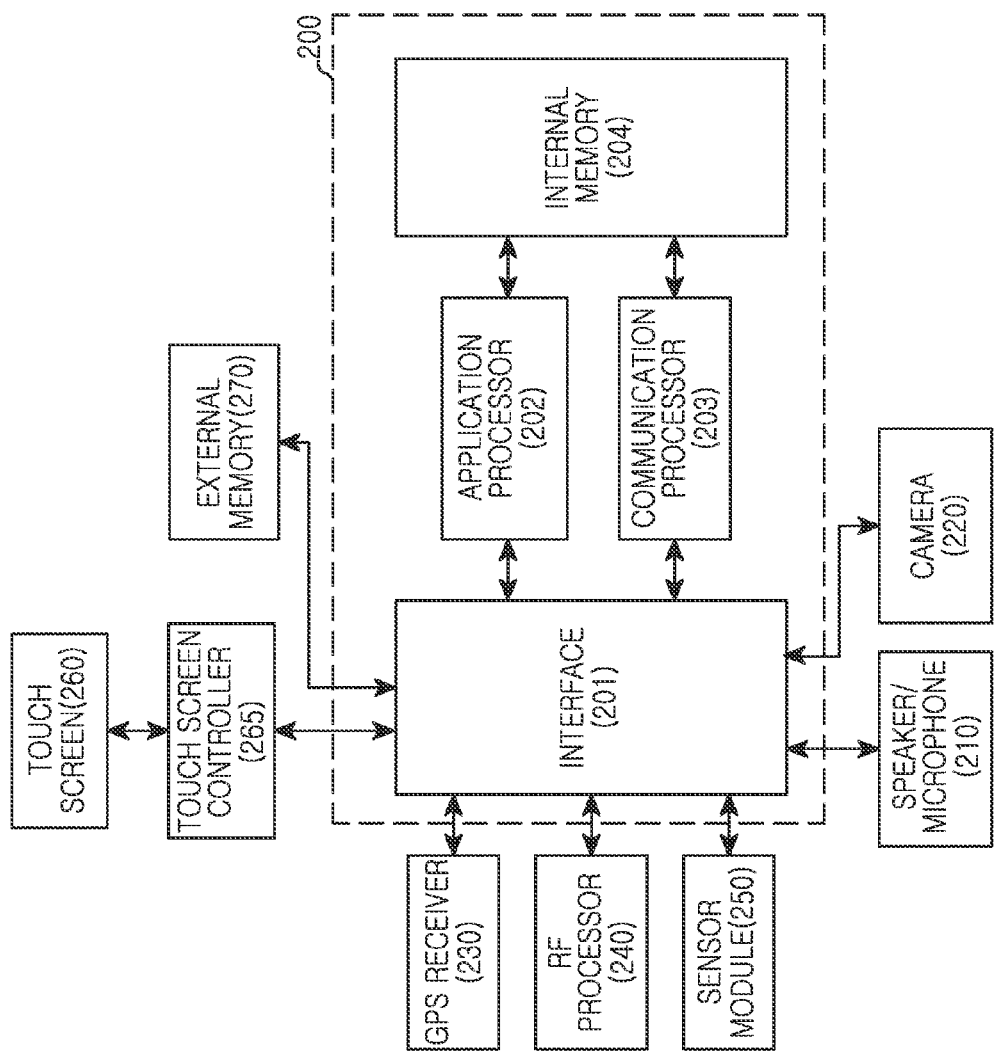
FIG. 2 is a block diagram illustrating a construction of an electronic device for e-book management according to an exemplary embodiment of the present invention.

FIG. 2 is a block diagram illustrating a construction of an electronic device for managing an e-book according to an exemplary embodiment of the present invention.

Referring to FIG. 2, the electronic device includes a controller 200, a speaker/microphone 210, a camera 220, a Global Positioning System (GPS) receiver 230, a Radio Frequency (RF) processor 240, a sensor module 250, a touch screen 260, a touch screen controller 265, and an external memory 270.

The controller 200 may include an interface 201, one or more processors 202 and 203, and an internal memory 204. According to exemplary implementations, the controller 200 is also called a processor. The interface 201, the application processor 202, the communication processor 203, and the internal memory 204 can be separate constituent elements or can be integrated in one or more integrated circuits.

The application processor 202 executes various software programs to perform various functions for the electronic device. The communication processor 203 performs processing and control for voice communication and data communication. Also, further to this general function, the processors 202 and 203 may play a role of executing a specific software module (i.e., an instruction set) stored in the external memory 270 or internal memory 204 to perform various functions corresponding to the software module. That is, the processors 202 and 203 interwork with the software modules stored in the external memory 270 or internal memory 204 to carry out a method of an exemplary embodiment of the present invention.

In exemplary embodiments of the present invention for e-book management, the application processor 202 has access to a site selling a corresponding e-book to download the corresponding e-book, determines class/lecture related information in association with the purchased e-book, displays the purchased e-book on a screen for e-book management of a timetable form and, if a corresponding class or lecture time event occurs (i.e., if a corresponding class or lecture time comes), the application processor 202 displays the text content of the e-book corresponding to the class or lecture time. Also, if sensing a touch of an object corresponding to the class or lecture related information, the application processor 202 displays a screen corresponding to the touched object.

In another exemplary embodiment of the present invention for e-book management, the application processor 202 displays a list of e-books stored in at least one of the memories 204 and 270, selects a class/lecture related e-book from the list of purchased e-books, determines class/lecture related information in association with the selected e-book, displays the purchased e-book on a screen for e-book management of a timetable form and, if sensing a touch of an object corresponding to the class or lecture related information, the application processor 202 displays a screen corresponding to the touched object.

Also, various functions of the electronic device according to exemplary embodiments of the present invention mentioned above or to be mentioned below can be executed by hardware including one or more processing and/or Application Specific Integrated Circuits (ASICs), and/or software, and/or a combination of them.

Furthermore, another processor (not shown) can include one or more of data processors, image processors, or COders/DECoders (CODECS). The data processor, the image processor, or the CODEC may be constructed separately, or the data processor, the image processor, or the CODEC may be constructed as several processors performing different functions.

The interface 201 is connected to the touch screen controller 265 of the electronic device and the external memory 270 thereof. Also, the sensor module 250 can be coupled to the interface 201 to make various functions possible. For instance, a motion sensor and an optical sensor can be coupled to the interface 201 to sense a motion of the electronic device and sense a light from the exterior, respectively. Besides this, a positioning system and other sensors such as a temperature sensor, a biological sensor and the like can be connected to the interface 201 to perform their related functions.

The camera 220 can be coupled with the sensor module 250 through the interface 201 to perform a camera function such as a snapshot and a video clip recording.

The RF processor 240 performs a communication function. For example, under the control of the communication processor 203, the RF processor 240 converts an RF signal into a baseband signal and provides the baseband signal to the communication processor 203, or converts a baseband signal from the communication processor 203 into an RF signal and transmits the RF signal. Here, the communication processor 203 processes a baseband signal in various communication schemes. For example, the communication scheme can include, though not limited to, a Global System for Mobile Communication (GSM) communication scheme, an Enhanced Data GSM Environment (EDGE) communication scheme, a Code Division Multiple Access (CDMA) communication scheme, a Wireless-Code Division Multiple Access (W-CDMA) communication scheme, a Long Term Evolution (LTE) communication scheme, an Orthogonal Frequency Division Multiple Access (OFDMA) communication scheme, a Wireless Fidelity (Wi-Fi) communication scheme, a WiMAX communication scheme or/and a Bluetooth communication scheme.

The speaker/microphone 210 is provided for input and output of an audio stream, such as voice recognition, voice reproduction, digital recording, a telephone function, and the like. That is, the speaker/microphone 110 converts a voice signal into an electrical signal, or converts an electrical signal into a voice signal. Although not illustrated, a detachable ear phone, a head phone or a head set can be connected to the electronic device through an external port.

The touch screen controller 265 can be coupled to the touch screen 260. The touch screen 260 and the touch screen controller 265 can detect a touch and a motion or interruption of them, by using, although not limited to, not merely capacitive, resistive, infrared and surface acoustic wave technologies for determining one or more touch points with the touch screen 260 but also any multi-touch sensing technology including other proximity sensor arrays or other elements.

The touch screen 260 provides an input/output interface between the electronic device and a user. That is, the touch screen 260 forwards a user's touch input to the electronic device. Also, the touch screen 260 is a medium for showing the user an output of the electronic device. That is, the touch screen 260 shows the user a visual output. This visual output is may be displayed in the form of a text, a graphic, a video and a combination of them.

In exemplary embodiments of the present invention, when the electronic device outputs a user interface for e-book management, it can be done through a screen. This screen can be also a touch screen processing a touch input.

The touch screen 260 can be any of various displays. For instance, the touch screen 260 can be, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), and the like.

The GPS receiver 230 converts signals received from three artificial satellites into information of a location, a speed, an hour and the like. For instance, the GPS receiver 230 determines distances between the artificial satellites and the GPS receiver 230 through a multiplication of the speed of light and signal arrival times, obtains accurate locations and distances of the artificial satellites, and measures a location of the electronic device in accordance with the known triangulation principle.

The external memory 270 and the internal memory 204 can include one or more high-speed random access memories and/or non-volatile memories such as magnetic disk storage devices, and one or more optical storage devices and/or flash memories (for example, NAND, NOR).

The external memory 270 and the internal memory 204 store software. A software constituent element includes an Operating System (OS) software module, a communication software module, a graphic software module, a user interface software module, a Moving Picture Experts Group (MPEG) module, a camera software module, one or more application software modules, and the like. Also, the module, a software constituent element, can be expressed as a set of instructions. Therefore, the module is also expressed as an instruction set. The module is also expressed as program.

The OS software includes various software constituent elements for controlling general system operation. This control of the general system operation means, for example, memory management and control, storage hardware (e.g., device) control and management, power control and management, and the like. The OS software performs even a function of making smooth communication between various hardware (devices) and software constituent elements (modules).

The communication software module enables communication with other electronic devices, such as a personal computer, a server and/or a portable terminal, and the like, through the RF processor 240. And, the communication software module may be constructed in a protocol structure corresponding to a communication scheme.

The graphic software module includes various software constituent elements for providing and displaying a graphic on the touch screen 260. The term 'graphic' is used herein to refer to a text, a web page, an icon, a digital image, a video, an animation, and the like.

The user interface software module includes various software constituent elements associated with a user interface. The user interface software module includes information about how a state of the user interface is changed or in which conditions the change of the state of the user interface is carried out, and the like. For instance, the user interface software module includes information related to control of a user interface for e-book management.

The camera software module includes a camera related software constituent element enabling camera related processes and functions. The application module includes a browser, an electronic mail (e-mail), an instant message, word processing, keyboard emulation, an address book, a touch list, a widget, Digital Right Management (DRM), voice recognition, voice reproduction, a position determining function, a location based service, and the like. The memories 270 and 204 can include additional modules (i.e., instructions) besides the modules mentioned above. Or, the memories 270 and 204 may not use some modules (i.e., instructions) according to need.

According to exemplary embodiments of the present invention, an instruction for e-book management has access to a site selling a corresponding e-book to download the corresponding e-book, determines class/lecture related information in association with the purchased e-book, displays the purchased e-book on a screen for e-book management of a timetable form and, if a corresponding class or lecture time event occurs (i.e., if a corresponding class or lecture time comes), the instruction displays the text content of the e-book corresponding to the corresponding class or lecture time. Also, if sensing a touch of an object corresponding to the class or lecture related information, the instruction displays a screen corresponding to the touched object.

An instruction according to an exemplary embodiment of the present invention for e-book management displays a list of e-books stored in the memories 204 and 270, selects a class/lecture related e-book from the list of purchased e-books, determines class/lecture related information in association with the selected e-book, displays the purchased e-book on a screen for e-book management of a timetable form and, if sensing a touch of an object corresponding to the class or lecture related information, the instruction displays a screen corresponding to the touched object.

Also, various functions of the electronic device according to exemplary embodiments of the present invention mentioned above or to be mentioned below can be executed by hardware including one or more processing and/or ASICs, and/or software, and/or a combination of them.

Figure 3:
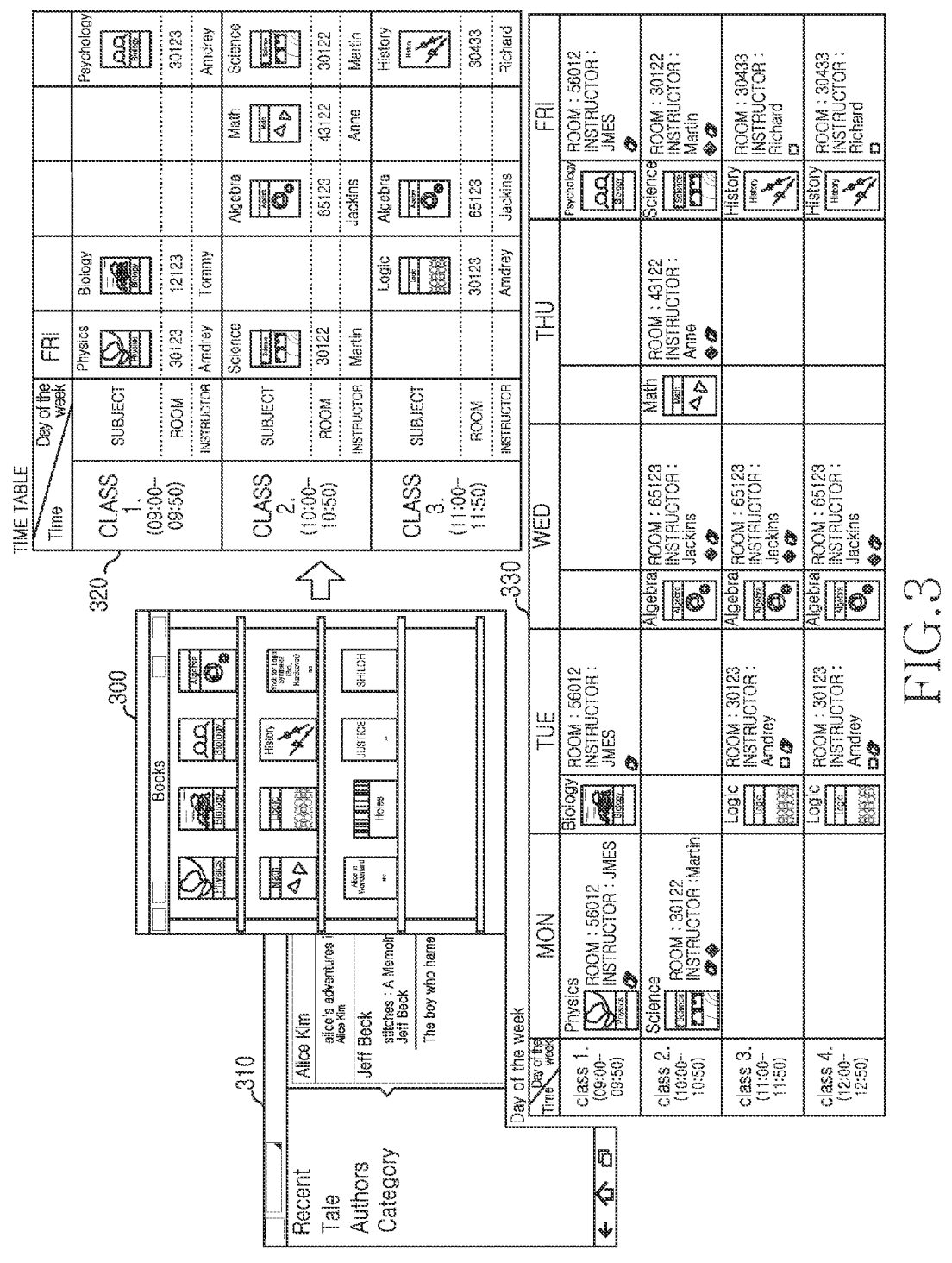

FIG. 3 illustrates a user interface for e-book management of a timetable form according to an exemplary embodiment of the present invention.

Referring to FIG. 3, a user can make a timetable viewer for students or participants and, by selecting a corresponding e-book from an existing bookcase of a bookshelf form 300 or list form 310, the user can make his/her own timetables 320 and 330.

FIGS. 4A and 4B illustrate examples of a screen display by time zone according to a bookcase display mode according to an exemplary embodiment of the present invention. Here, the time zone, which is the unit counting a class time, can be defined as a class hour.

Referring to FIG. 4A, in a case of a vertical display mode (i.e., a narrow display mode), an electronic device briefly displays content related to one class in an icon form as denoted by reference numeral 420, which is similar to reference numeral 320 illustrated in FIG. 3. For example, the electronic device briefly displays memo, notebook, and attachment functions in an icon form.

Referring to FIG. 4B, in a case of a horizontal display mode (i.e., a wide display mode), because there is a spatial margin to show additional information, the electronic device displays the latest data about supplementary information (e.g., a memo, a notebook, and an attachment) in a screen as denoted by reference numeral 430, which is similar to reference numeral 330 illustrated in FIG. 3. For example, the electronic device displays the number of contents written in the memo and notebook and the latest contents in the screen and, if there is the attachment, the electronic device displays the number of attachment files, names of the attachment files, and the like in the screen.

In an exemplary implementation, a default viewer can be displayed as a week timetable as denoted by reference numerals 320 and 330. For example, a viewer by day of the week and a viewer by subject can be set as in FIG. 5 and FIG. 6 below.

FIG. 5 illustrates a day of the week view according to an exemplary embodiment of the present invention.

Referring to FIG. 5, the day of the week view displays class/lecture related textbook and class/lecture related information by time zone of Friday. For example, the day of the week view displays a psychology textbook icon, room information, instructor information, and a notebook function related icon at the first class hour (09:00 to 09:50) of Friday, displays a science textbook icon, room information, instructor information, a notebook function related icon, and an attachment function related icon at the second class hour (10:00 to 10:50) of Friday, and displays a history textbook icon, room information, instructor information, and a memo function related icon at the third class hour (11:00 to 11:50) to the fourth class hour (12:00 to 12:50) of Friday.

FIG. 6 illustrates a subject view according to an exemplary embodiment of the present invention.

Referring to FIG. 6, subjects are listed in order of algebra, biology, history, logics, mathematics, and physics. And, a textbook, a room, an instructor, and a notebook/memo/attachment function related icon are displayed for each subject.

Figure 7:
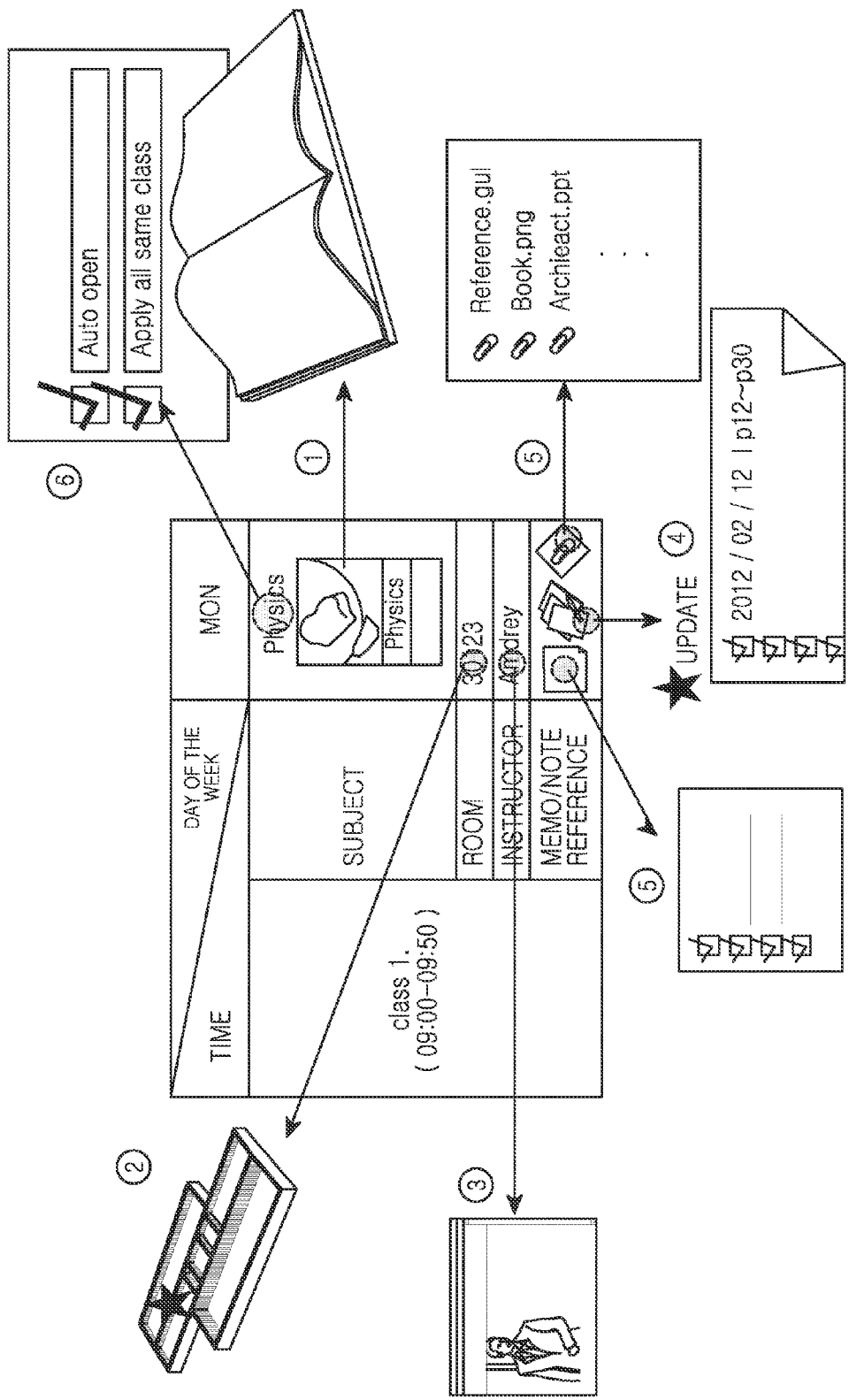
FIG. 7 illustrates a user interface for e-book management according to an exemplary embodiment of the present invention.

FIG. 7 illustrates a user interface for e-book management according to an exemplary embodiment of the present invention.

Referring to FIG. 7, in the user interface for e-book management of a timetable form, a user inputs lecture related information such as a time per time zone, a subject, a room, and an instructor, to timetable blanks. On the other hand, the user can select a lecture related e-book from a file list such as an existing bookshelf or explorer. In an exemplary implementation, the user can select the lecture related e-book by purchasing the lecture related e-book through the Internet. The selected e-book is registered as a main textbook for class. For example, the selected e-book is registered to a physics class of the first class hour of Monday, and physics related additional information (i.e., an instructor, a room, a memo/notebook, an attachment function and the like) are set and displayed.

In an exemplary embodiment, if the user touches a physics textbook icon in the user interface, the user interface displays the text content of a corresponding e-book (①). If the user touches a physics room icon, the user interface displays a room related map (i.e., a sketch map for room location) and the like (②). If the user touches an instructor name icon, the user interface moves to a homepage of a corresponding instructor (③). On the other hand, if the user connects and selects a related document (i.e., a memo, a notebook, an attachment file and the like) necessary for a corresponding class together, the user can simply refer to a subject related document. For example, through the memo, the user can record and check homework or a significant item. Corresponding content is synchronized with a memo application, so even the memo application can identically view the corresponding content (④). Apart from the memo, one notebook by class is made interworkable with a notebook related application, so the user can make clean handwriting content by subject in the notebook (⑤). Or, the user interface can attach and manage reference documents related to each subject (⑤). Also, since the user can be made aware of an e-book necessary for a class through timetable information, a user's setting can be configured such that, if a corresponding class time occurs, the user interface can automatically open and display the e-book on a screen or can inform the same to the user by alarm. For example, if "Auto open" is checked, the e-book is automatically opened and displayed at a corresponding class time (⑥) and, if "Apply all same class" is checked, the e-book is automatically opened and displayed at all the same class time (⑥).

On the other hand, various user interfaces can perform complicated or only certain functions according to users. For example, a user 'A' can intend to view only an e-book, and a user 'B' can intend to view only an e-book and its related notebook. To meet these various tastes or requirements of a user, a user interface using a timetable can display only desired information on a screen of a small size through a user's setting, as in FIG. 8 below.

Figure 8:
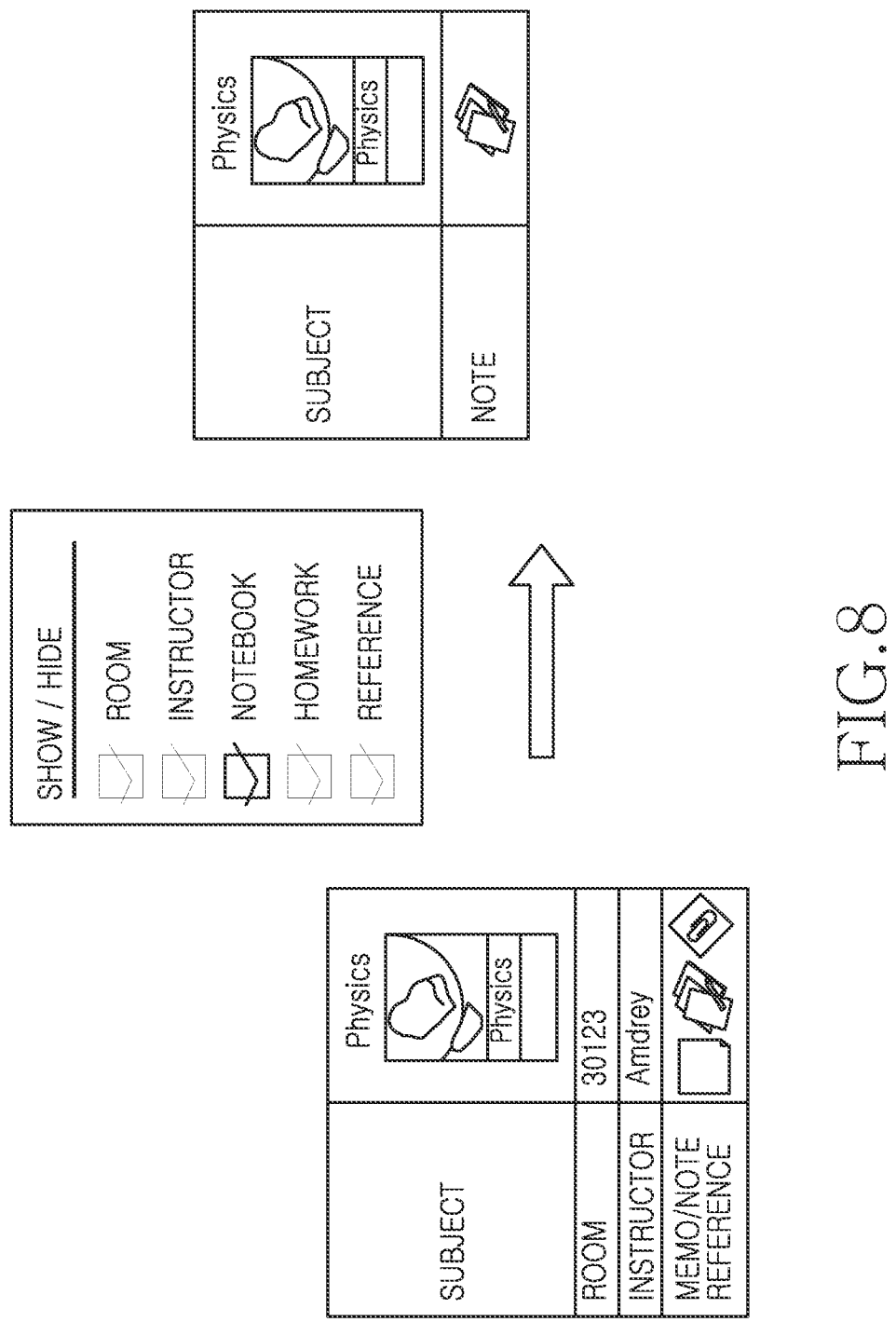
FIG. 8 illustrates setting a function of a user interface for limiting information display according to an exemplary embodiment of the present invention.

FIG. 8 illustrates setting a function of a user interface for limiting information display according to an exemplary embodiment of the present invention.

Referring to FIG. 8, a user can check and unhide desired items among a textbook related e-book, a room, an instructor, a memo/notebook, a reference, and the like. For example, when only the notebook is checked, only a textbook related e-book icon and a notebook related function icon are displayed.

Figure 9:
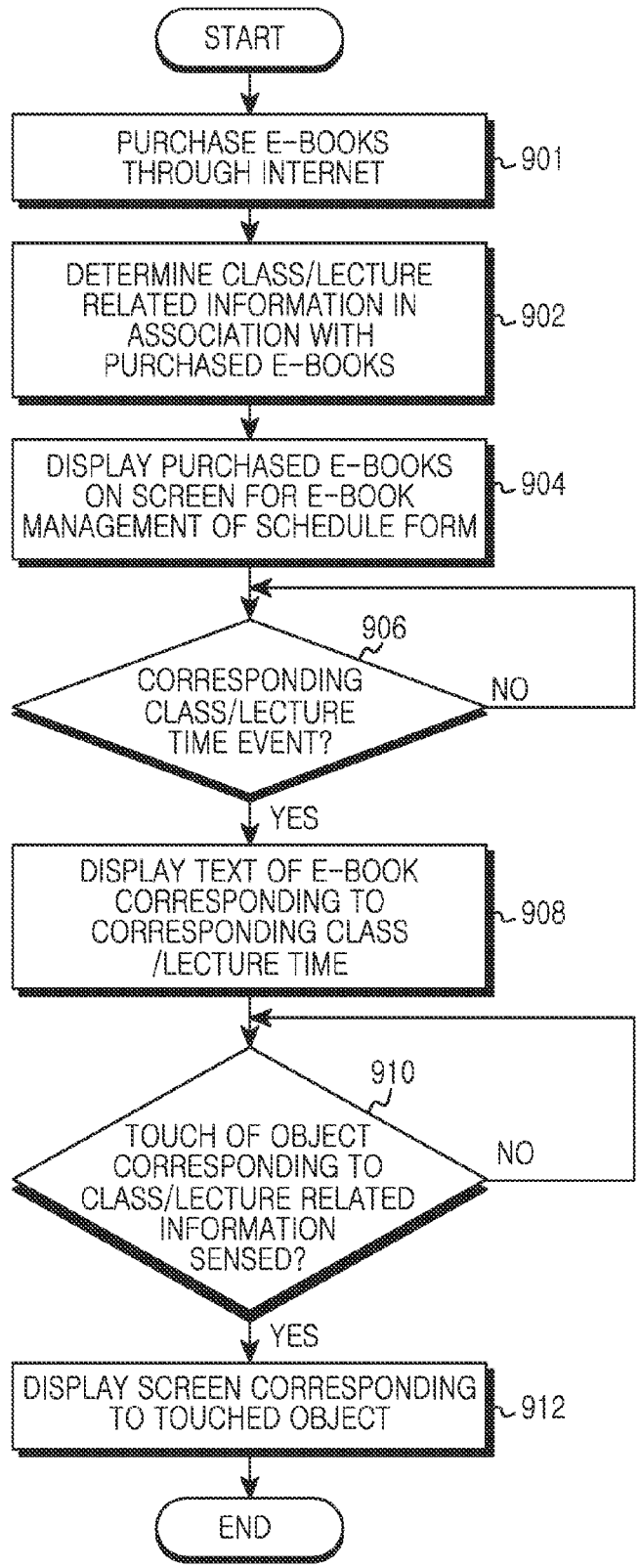
FIG. 9 is a flowchart illustrating a procedure for e-book management of a timetable form according to an exemplary embodiment of the present invention.

FIG. 9 is a flowchart illustrating a procedure for e-book management of a timetable form according to an exemplary embodiment of the present invention.

Referring to FIG. 9, a user purchases e-books through the Internet by using an electronic device in step 901. That is, the user has access to a site selling corresponding e-books to download the corresponding e-books.

In step 902, the user determines class/lecture related information in association with the purchased e-books by using the electronic device. That is, as illustrated in FIG. 7, the user inputs room and instructor information. For instance, if an input window is popped up at a time the user touches a corresponding item, the user can input information through the input window. Or, the user may input all information (e.g., room and instructor information) through one input window.

In step 904, the electronic device displays the purchased e-books on a screen for e-book management of a timetable form as in FIGS. 4A and 4B.

If a corresponding class or lecture time event occurs, i.e., if a corresponding class or lecture time comes in step 906, the electronic device proceeds to step 908 and displays the text content of an e-book corresponding to the corresponding class or lecture time. For example, as illustrated in FIG. 7, if the user touches a physics textbook icon, the electronic device displays the text content of a physics e-book (①).

If sensing a touch of an object corresponding to the class or lecture related information in step 910, the electronic device proceeds to step 912 and displays a screen corresponding to the touched object. For example, as illustrated in FIG. 7, if the user touches a room icon, the electronic device displays a room related map (i.e., a sketch map for room location) and the like (②). If the user touches an instructor name icon, the electronic device moves to a homepage of a corresponding instructor (③). If the user touches memo, notebook, or attachment icon, the electronic device executes a corresponding application to display a list of memos, notebooks or attachment files (④, ⑤).

Figure 10:
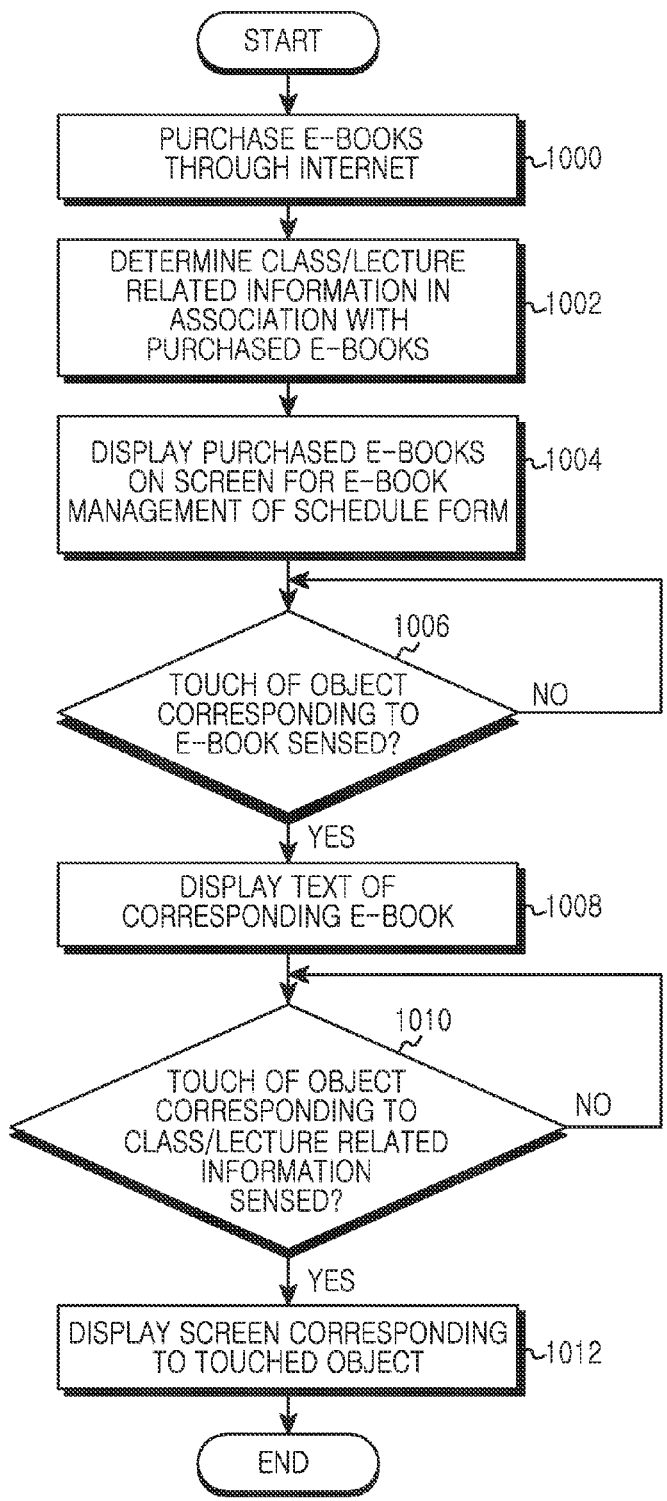
FIG. 10 is a flowchart illustrating a procedure for e-book management of a timetable form according to an exemplary embodiment of the present invention.

FIG. 10 is a flowchart illustrating a procedure for e-book management of a timetable form according to an exemplary embodiment of the present invention.

Referring to FIG. 10, in step 1000, a user purchases e-books through the Internet by using an electronic device. That is, the user has access to a site that sells corresponding e-books to purchase and download the corresponding e-books.

In step 1002, the user determines class/lecture related information in association with the purchased e-books by using the electronic device. That is, as illustrated in FIG. 7, the user inputs room and instructor information. For instance, if an input window is popped up at a time the user touches a corresponding item, the user can input information through the input window. Or, the user may input all information through one input window.

In step 1004, the electronic device displays the purchased e-books on a screen for e-book management of a timetable form as illustrated in FIGS. 4A and 4B.

If the user touches a textbook icon in step 1006, the electronic device proceeds to step 1008 and displays the text content of an e-book corresponding to a corresponding class or lecture time. For example, as illustrated in FIG. 7, if the user touches a physics textbook icon, the electronic device displays the text content of a physics e-book (①).

On the other hand, if sensing a touch of an object corresponding to class or lecture related information in step 1010, the electronic device proceeds to step 1012 and displays a screen corresponding to the touched object. For example, as in FIG. 7, if the user touches a room icon, the electronic device displays a room related map (i.e., a sketch map for room location) and the like (②). If the user touches an instructor name icon, the electronic device moves to a homepage of a corresponding instructor (③). If the user touches memo, notebook, or attachment icon, the electronic device executes a corresponding application to display a list of memos, notebooks or attachment files (④, ⑤).

Exemplary embodiments of the present invention address a condition in which a user purchases a corresponding e-book through the Internet. According to another exemplary implementation, the user can select an e-book already purchased and stored in the electronic device and construct the e-book in a timetable form as in FIG. 11 below.

Figure 11:
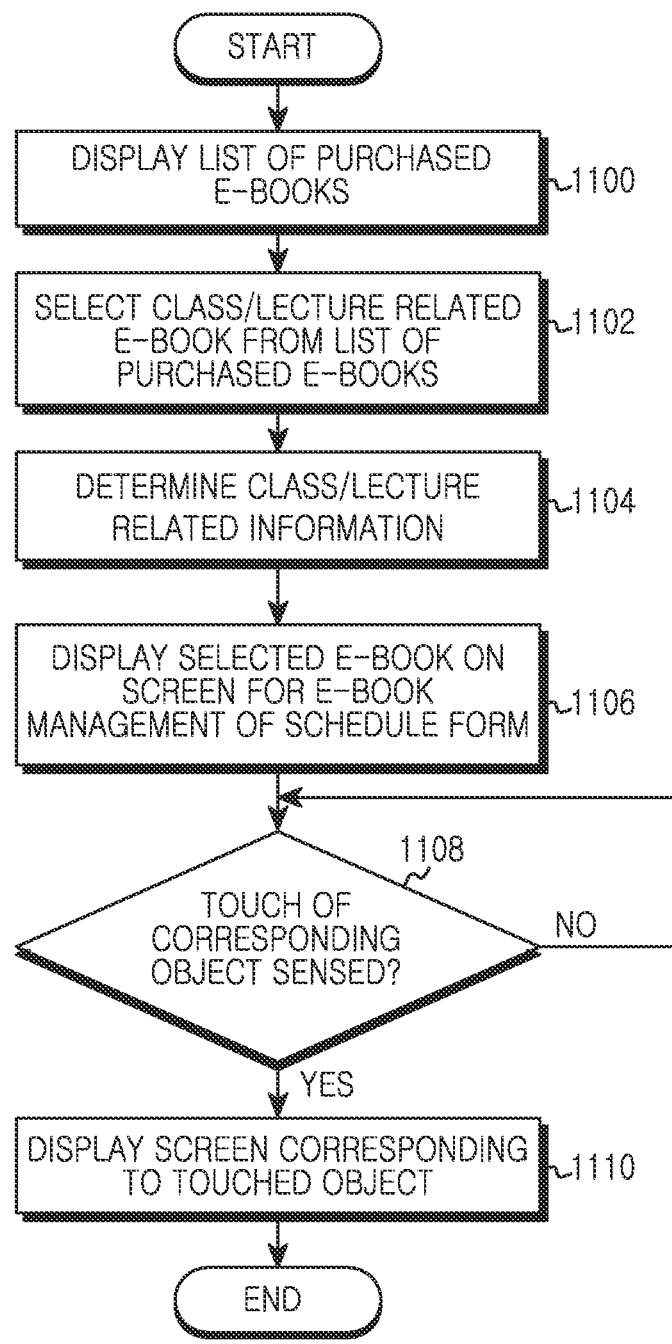
FIG. 11 is a flowchart illustrating a procedure for e-book management of a timetable form according to an exemplary embodiment of the present invention.

FIG. 11 is a flowchart illustrating a procedure for e-book management of a timetable form according to an exemplary embodiment of the present invention.

Referring to FIG. 11, in step 1100, an electronic device displays a list of e-books which are purchased and stored in an internal memory of the electronic device.

In step 1102, the electronic device selects a class/lecture related e-book from the list of purchased e-books. For example, a user drags and drops an icon of a corresponding e-book from the list of e-books to a corresponding class hour of a timetable. In an exemplary embodiment, the user can select one e-book from the list of e-books after double clicking a corresponding class hour.

In step 1104, the electronic device determines class/lecture related information in association with the selected e-book. That is, as illustrated in FIG. 7, the user inputs room and instructor information. For instance, if an input window is popped up at a time the user touches a corresponding item, the user can input information through the input window. Or, the user may input all information through one input window.

In step 1106, the electronic device displays the purchased e-book on a screen for e-book management of a timetable form as in FIGS. 4A and 4B.

If the electronic device senses a touch of an object corresponding to the class or lecture related information in step 1108, the electronic device proceeds to step 1110 and displays a screen corresponding to the touched object. For example, as illustrated in FIG. 7, if the user touches a room icon, the electronic device displays a room related map (i.e., a sketch map for room location) and the like (②). If the user touches an instructor name icon, the electronic device moves to a homepage of a corresponding instructor (③). If the user touches memo, notebook, or attachment icon, the electronic device executes a corresponding application to display a list of memos, notebooks or attachment files (④, ⑤).

To provide a convenient user interface to students or participants, a user may input a related subject and supplementary information one by one. Unlike this, according another realization, when an electronic device interworks with an education matters management system of a corresponding school, the electronic device can receive provision of information of subjects enrolled through the education matters management system and automatically update a user interface of a bookcase form of a timetable form, as in FIG. 12 below.

Figure 12:
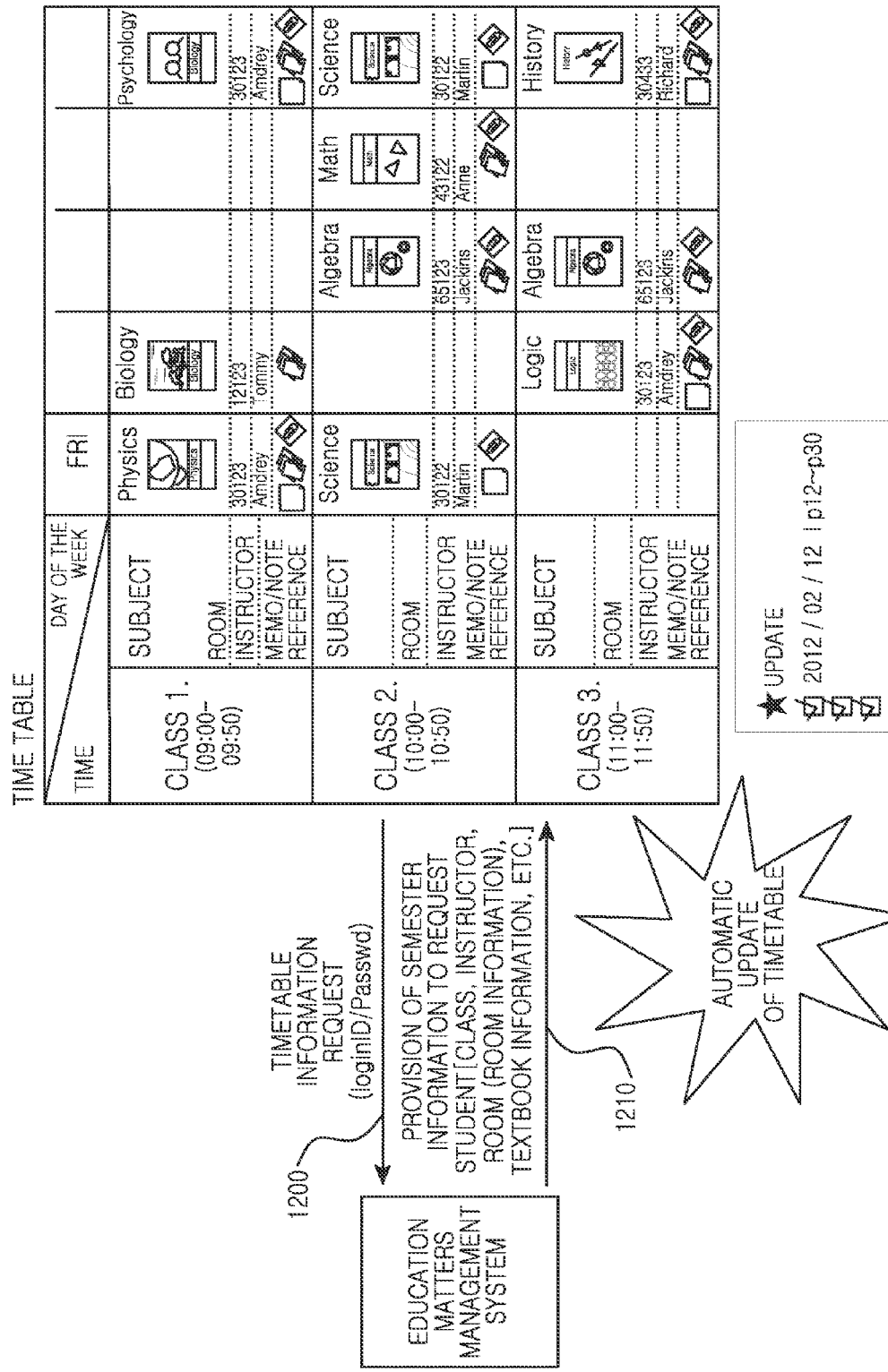
FIG. 12 illustrates a user interface for e-book management of a timetable form according to an exemplary embodiment of the present invention.

FIG. 12 illustrates a user interface for e-book management of a timetable form according to an exemplary embodiment of the present invention.

Referring to FIG. 12, if a user interface for e-book management of a timetable form interworks with an education matters management system, although a user does not manually input information, he/she can use the user interface more easily and conveniently by automatically updating the information. For instance, if the user logs in to the education matters management system through the electronic device (1200), the education matters management system provides class, instructor, room, and textbook information to the user with reference to timetable information of the user (1210).

On the other hand, although not illustrated, if a teacher assigns homework to students, the students may submit the homework by using a memo function interworking in relation to each class. Furthermore, this can also be used if interworking with the education matters management system. For example, if the teacher assigns homework through the education matters management system, the education matters management system automatically transmits homework information to students who attend a corresponding class. The homework information is updated to corresponding time information through information collection, and is forwarded to the students. In absence of the education matters management system, the same effect can be given, if the teacher forwards the homework information to the students in a message form and an application registers the homework information as corresponding time information.

Methods according to exemplary embodiments disclosed in claims of the present invention and/or the specification thereof can be implemented as hardware, software, or a combination of hardware and software.

In a case of implementing in the software form, a computer readable storage medium storing one or more programs (i.e., software modules) can be provided. One or more programs stored in the computer readable storage medium are configured to be executable by one or more processors within an electronic device. One or more programs include instructions for enabling the electronic device to execute the methods according to the exemplary embodiments disclosed in the claims of the present invention and/or the specification thereof.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs can be stored in a memory configured by a combination of some or all of them. Also, each configuration memory may be included in plural.

Further, the programs can be stored in an attachable storage device accessible to the electronic device through a communication network such as the Internet, an intranet, a Local Area Network (LAN), a Wireless LAN (WLAN) or a Storage Area Network (SAN), or a communication network configured by a combination of them. This storage device can have access to the electronic device through an external port.

Furthermore, a separate storage device on a communication network may have access to the portable electronic device.

As described above, exemplary embodiments of the present invention have an advantage of, by providing a user interface for e-book management of a timetable form, being capable of increasing the utilization of an e-book viewer for students or participants.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating an electronic device, the method comprising:
   displaying a list of e-books which are purchased and stored in a memory of the electronic device;
   selecting an e-book from the list of e-books;
   receiving a user input of class related information in association with the selected e-book, the class related information being provided using alphanumeric characters and icons;
   creating a timetable by mapping the class related information to the selected e-book;

if a class time event occurs, displaying the timetable comprising objects corresponding to one or more e-books and class related information associated with each of the one or more e-books;

detecting a selection of an object in the timetable; and displaying a page corresponding to the selected object, wherein the page includes information associated with the selected object among the class related information, and wherein the timetable is updated automatically by timetable information associated with the user, the timetable information being received from an external system.

2. The method of claim 1, wherein the input class related information includes information about at least one of a time, a time zone, a subject, a textbook, a room, an instructor, a note, a memo, and or reference materials.

3. The method of claim 2, wherein the displaying of the page corresponding to the selected object comprises displaying a room related location map when the object selected within the timetable corresponds to the room.

4. The method of claim 2, wherein the displaying of the page corresponding to the selected object comprises displaying an instructor homepage when the object selected within the timetable corresponds to the instructor.

5. The method of claim 1, wherein the displaying of the timetable comprises displaying icons related to at least one of a notebook, a memo, or attachment functions in the timetable.

6. The method of claim 1, further comprising:

according to a first mode, displaying reference materials associated with a class by time within the timetable, in an icon form; and according to a second mode, attaching a supplementary description to the reference materials associated with the class by time within the timetable and displaying the supplementary description attached with the reference materials.

7. The method of claim 1, wherein the displaying of the timetable comprises displaying only a corresponding day of the week in the timetable.

8. The method of claim 1, wherein the displaying of the timetable comprises arranging and displaying the timetable by subject.

9. The method of claim 1, further comprising selecting an item intended to be displayed among the class related information displayed in the timetable.

10. The method of claim 1, wherein the creating of the timetable by mapping of the class related information to the selected e-book comprises:

selecting an e-book from a list of previously stored e-books associated with the user; and selecting at least one or more times displayed within the timetable.

11. The method of claim 1, wherein the creating of the timetable by mapping the class related information to the selected e-book comprises:

receiving an indication that the user has selected and dragged an indication associated with an e-book from a list of previously stored e-books; and receiving an indication that the user has correlated the indication associated with the e-book with a time within the timetable.

12. The method of claim 1, further comprising automatically displaying a corresponding e-book at a corresponding day of the week and a corresponding time.

13. The method of claim 1, wherein the timetable is displayed by at least one of week, day of the week, or subject.

14. An electronic device comprising: an input device; a display; a memory; and at least one processor configured to: display on the display, a list of e-books which are purchased and stored in the memory of the electronic device, select an e-book from the list of e-books; receive a user input of class related information associated with the selected e-book, the class related information being provided using alphanumeric characters and icons, create a timetable by mapping the class related information to the selected e-book, if a class time event occurs, display the timetable comprising objects corresponding to the one or more e-books and class related information associated with each of the one or more e-books, detect a selection of an object in the timetable, and display a page corresponding to the selected object wherein the page includes information associated with the selected object among the class related information, and wherein the timetable is updated automatically by timetable information associated with the user, the timetable information being received from an external system.

15. The electronic device of claim 14, wherein the class related information includes information about at least one of a time, a time zone, a subject, a textbook, a room, an instructor, a note, a memo, or reference materials.

16. The electronic device of claim 15, wherein the at least one processor is further configured to display a room related location map when the object selected within the timetable corresponds to the room.

17. The electronic device of claim 15, wherein the at least one processor is further configured to display an instructor homepage when the object selected within the timetable corresponds to the instructor.

18. The electronic device of claim 14, wherein the at least one processor is further configured to display icons related to at least one or more of a notebook, a memo, or attachment functions in the timetable.

19. The electronic device of claim 14, wherein the at least one processor is further configured to:

according to a first mode, display reference materials associated with a class by time within the timetable, in an icon form, and according to a second mode, display a supplementary description to the reference materials associated with the class by time within the timetable and to display the supplementary description attached with the reference materials.

20. The electronic device of claim 14, wherein the at least one processor is further configured to display only a corresponding day of the week in the timetable.

21. The electronic device of claim 14, wherein the at least one processor is further configured to:

create the timetable such that the timetable is arranged by subject, and display the timetable arranged by subject.

22. The electronic device of claim 14, wherein the at least one processor is further configured to select an item intended to be displayed among the class related information displayed in the timetable.

23. The electronic device of claim 14, wherein the at least one processor is further configured to map the input information to one or more e-books associated with the user by:

receiving a selection from a user of an e-book from a list of previously stored e-books associated with the user, and receiving a selection from a user of at least one or more times displayed within the timetable.

24. The electronic device of claim 14, wherein the at least one processor is further configured to map the input information to one or more e-books associated with the user by:
  receiving an indication that the user has selected and dragged an indication associated with an e-book from a list of previously stored e-books, and
  receiving an indication that the user has correlated the indication associated with the e-book with a time within the timetable.

25. The electronic device of claim 14, wherein the at least one processor is further configured to automatically display a corresponding e-book at a corresponding day of the week and a corresponding time.

26. The electronic device of claim 14, wherein the timetable is displayed by at least one of week, day of the week, or subject.

* * * * *